United States Patent
Gerbetz

(10) Patent No.: US 6,366,042 B1
(45) Date of Patent: Apr. 2, 2002

(54) ANTI-PINCH POWER WINDOW SYSTEM AND METHOD

(75) Inventor: Robert Gerbetz, Waukegan, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/783,342

(22) Filed: Feb. 14, 2001

(51) Int. Cl.[7] ............................................... H02P 1/22
(52) U.S. Cl. ..................... 318/286; 318/266; 318/466; 318/470; 49/28; 49/26
(58) Field of Search .................................. 318/445, 466, 318/470, 266, 268, 286; 49/26, 28

Primary Examiner—Robert E. Nappi
Assistant Examiner—Rita Leykin
(74) Attorney, Agent, or Firm—Kenneth D. Labudda

(57) ABSTRACT

A method (100) for closing a motor-driven window comprises the steps of determining (102) a window gap, and raising (104) the window at a speed dependent upon the window gap. The speed is selected based on the window gap and is reduced as the window gap approaches a pinch region such that the pinch-force is limited to a safe value. A vehicle power-window system (400) comprises a window assembly (410), a battery (420), an electric motor (430), a mechanical assembly (440), and a control circuit (450). Control circuit (450) monitors the window gap and supplies drive voltage to the electric motor in dependence on the window gap, so as to control the speed of the window in accordance with the disclosed method (100). Preferably, control circuit (450) includes a regulator circuit (460) and a processor (470), and the drive voltage is substantially unaffected by at least some changes in the battery voltage.

20 Claims, 4 Drawing Sheets

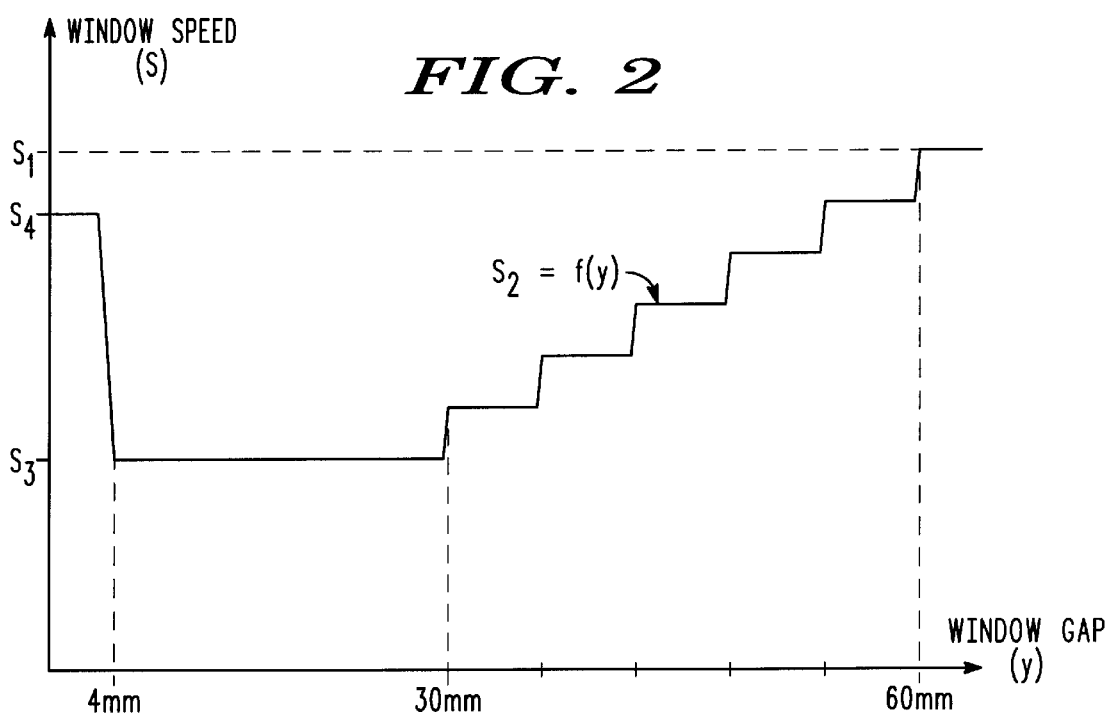
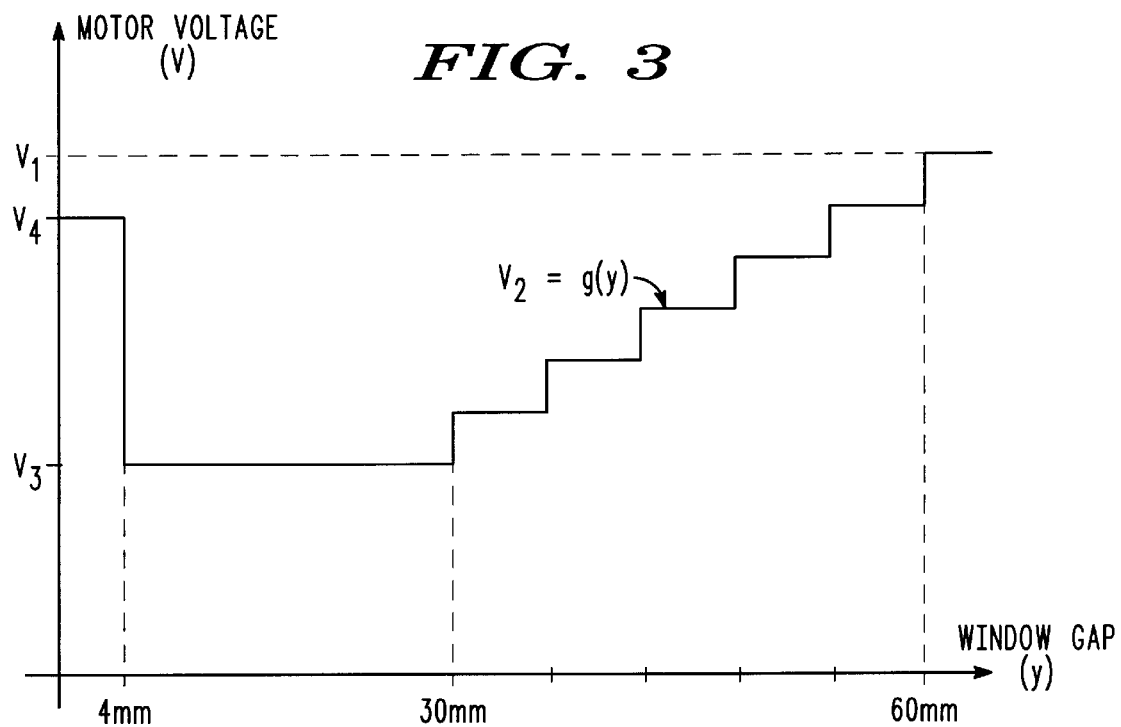

| $V_B$ (VOLTS) | DUTY CYCLE (%) | | | | | |
|---|---|---|---|---|---|---|
| | y = 30mm | y = 36mm | y = 42mm | y = 48mm | y = 54mm | y = 60mm |
| 20 | 61 | 63 | 66 | 69 | 71 | 74 |
| 19 | 64 | 66 | 69 | 72 | 75 | 78 |
| 18 | 67 | 69 | 72 | 75 | 78 | 82 |
| 17 | 70 | 73 | 76 | 79 | 83 | 86 |
| 16 | 73 | 77 | 80 | 84 | 87 | 90 |
| 15 | 78 | 82 | 85 | 89 | 93 | 94 |
| 14 | 84 | 87 | 90 | 94 | 96 | 98 |
| 13 | 89 | 93 | 96 | 97 | 98 | 99 |
| 12 | 95 | 97 | 99 | 99 | 100 | 100 |
| 11 | 98 | 99 | 100 | 100 | 100 | 100 |
| 10 | 100 | 100 | 100 | 100 | 100 | 100 |
| 9 | 100 | 100 | 100 | 100 | 100 | 100 |
| 8 | 100 | 100 | 100 | 100 | 100 | 100 |
| 7 | 100 | 100 | 100 | 100 | 100 | 100 |
| 6 | 100 | 100 | 100 | 100 | 100 | 100 |

*FIG. 5*

ANTI-PINCH POWER WINDOW SYSTEM AND METHOD

FIELD OF THE INVENTION

The present invention relates to the general subject of power windows. More particularly, the present invention relates to a system and method for closing a motor-driven window in a safe and efficient manner.

BACKGROUND OF THE INVENTION

Power windows are standard equipment in many vehicles manufactured at the present time. An important problem in power window systems relates to pinch force, which is defined as the force that is exerted upon an obstruction (e.g., a person's head) that is introduced between the window glass and the window frame while the window is closing. One accepted specification is that, while the window gap (i.e., the distance between an upper edge of the window glass and a corresponding top portion of the window frame) is between 4 millimeters (mm) and 30 mm (i.e., the pinch region), the pinch force must not exceed 100 newtons.

In some existing power window systems, the shaft of the electric motor driving the window generally rotates too fast to be stopped in time to avoid exceeding a 100 newton pinch force. This is a consequence of the fact that conventional power window motors have considerable inertia and thus do not slow down instantaneously. Therefore, to avoid exceeding the maximum allowable pinch force, it is necessary that the window speed be limited while the window is being raised through the pinch region.

One approach is to simply hold the speed at a constant low level over the full range of travel. Unfortunately, this approach has the disadvantage of significantly increasing the amount of time it takes to close the window, which can be a major inconvenience (e.g., upon leaving a toll booth). A need exists for an approach that satisfies anti-pinch requirements, but that does so in a manner that still allows the window to close in a reasonably fast manner.

Additionally, in many prior art systems, the speed at which the window closes is critically dependent upon the battery voltage, which can vary over an appreciable range. For example, in systems that close the window at a uniform speed (which must be relatively low in order to satisfy anti-pinch requirements), a reduction in battery voltage has the undesirable effect of further decreasing the already low speed at which the window closes. Thus, there is also a need for an approach that at least partially compensates for variations in battery voltage so that the amount of time that it takes to close the window is less negatively impacted.

BRIEF DESCRIPTION OF THE DRAWINGS

FIG. 2 is a plot of window speed versus window gap, in accordance with a preferred embodiment of the present invention.

FIG. 3 is a plot of motor voltage versus window gap, in accordance with a preferred embodiment of the present invention.

FIG. 5 describes a look-up table that yields duty cycle as a function of window gap and battery voltage, in accordance with a preferred embodiment of the present invention.

DETAILED DESCRIPTION OF THE PREFERRED EMBODIMENTS

Figure 1:
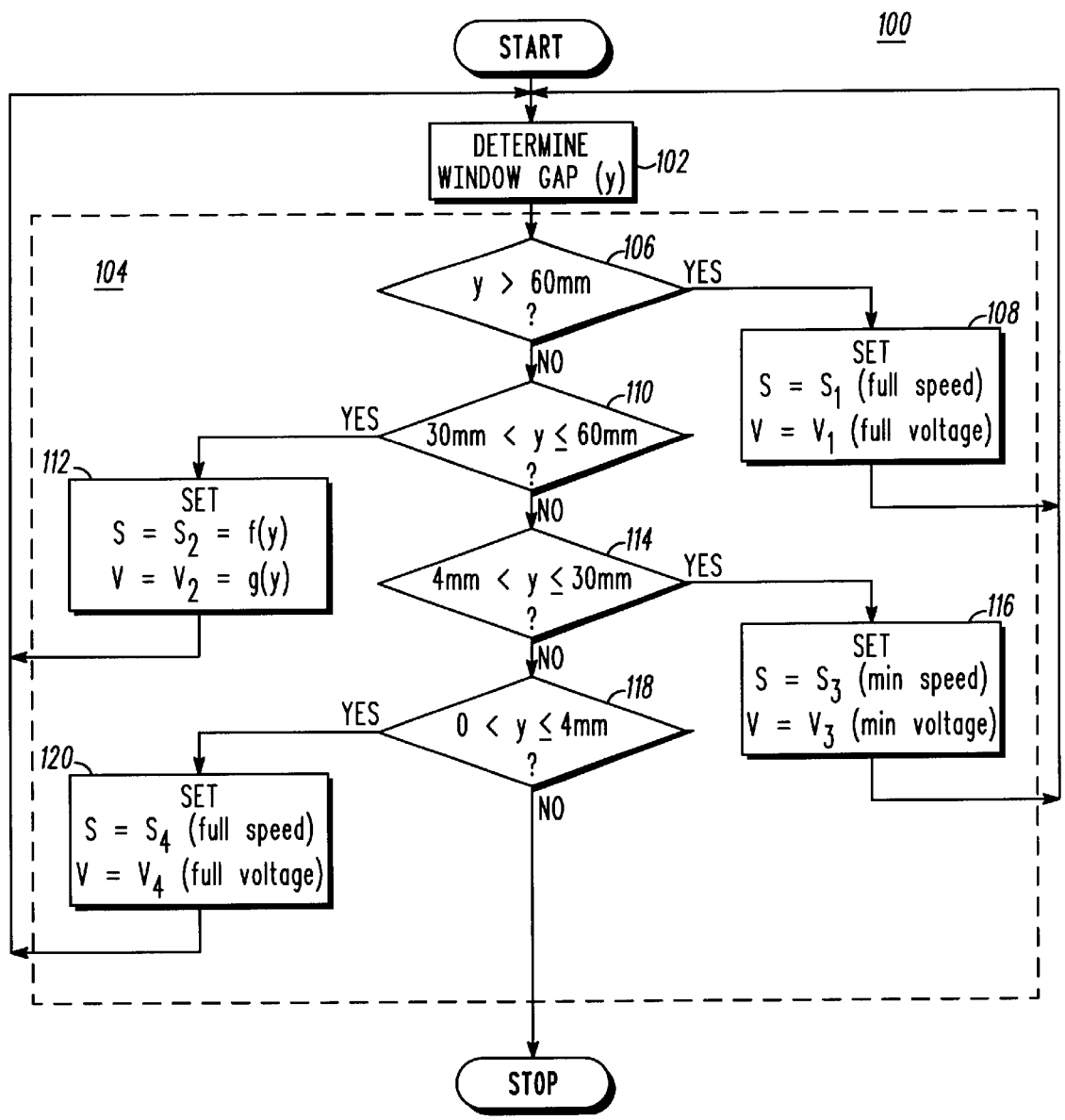
FIG. 1 is a flowchart that describes a method for closing a motor-driven window, in accordance with a preferred embodiment of the present invention.

FIG. 1 describes a method 100 for closing a motor-driven window, where the window is understood to include window glass (i.e., the portion that actually opens and closes) and a window frame. Method 100 comprises two main steps: (i) determining (102) a window gap defined as a distance, y, between an upper edge of the window glass and a corresponding top portion of the window frame; and (ii) raising (104) the window at a speed, s, dependent upon the window gap.

Step 104 includes four sub-steps described as follows: (a) when the window gap, y, is greater than a first value (e.g., 60 millimeters), s is set at a first speed, $s_1$, as described by 106,108; (b) when y is less than the first value but greater than a second value (e.g., when 60 mm$\geq$y>30 mm), s is set at a second speed, $s_2$, that is less than $s_1$, as described by 110,112; (c) when y is less than the second value but greater than a third value (e.g., when 30 mm$\geq$y>4 mm), s is set at a third speed, $s_3$, that is less than $s_1$ and $s_2$, as described by 114,116; and (d) when y is less than the third value but greater than zero (e.g., when 4 mm$\geq$y>0), s is set at a fourth speed, $s_4$, that is greater than $s_3$, as described by 118,120. When y reaches zero, the window is closed and s obviously equals zero.

In sub-step (a), $s_1$ is preferably equal to full speed, as the window is then in the first part of the closing cycle and is not yet approaching the pinch region (e.g., 30 mm$\geq$y>4 mm). In this first part of the closing cycle, it is desired that the window rise quickly so as to minimize the total time that it takes to close the window.

In sub-step (b), $s_2$ is preferably a function, f(y), of the window gap, and is reduced as y is reduced from the first value (e.g., 60 mm) to the second value (e.g., 30 mm). The reduction in $s_2$ can be effected in either a continuous manner or in a substantially stepwise manner; the latter approach is illustrated in FIG. 2. Thus, by the time the window reaches the pinch region (e.g., 30 mm$\geq$y>4 mm), the window speed is reduced to a safe level.

In sub-step (c), $s_3$ is preferably set at a minimum speed because the window is then in the pinch region. The minimum speed, $s_3$, is set at a predetermined level such that, if a physical obstruction is introduced between the window frame and the upper edge of the window glass when, e.g., 30 mm$\geq$y>4 mm, the pinch force exerted on the obstruction by the window will be limited to less than about one hundred newtons. In practice, the predetermined level for $s_3$ that ensures a pinch force of less than 100 newtons is dictated by the characteristics (e.g., torque and inertia) of the motor and the mass of the load (i.e., the window glass, etc.) driven by the motor.

In sub-step (d), $s_4$ is preferably equal to full speed in order to ensure adequate closure (i.e., a good seal) between the window and the rubber molding on the top portion of the window frame.

FIG. 2 illustrates how, in the preferred method, the speed at which the window is raised changes as a function of the window gap. Although described as such in FIG. 2, the stepwise reductions in speed that occur when y is between 60 mm and 30 mm need not be uniform. Note that, because the window is driven by an electric motor having a finite inertia, the speed does not change in a strictly instantaneous manner; rather, a finite amount of time is required in order to effect a change in the speed from one value to another.

In describing method 100, the preceding discussion speaks in terms of window speed. Alternatively, method 100 can be described in terms of the voltage applied to a motor that opens and closes the window, wherein the speed at which the window closes is a function of the voltage applied to the motor. Referring again to FIG. 1, method 100 comprises two main steps: (i) determining (102) a window gap defined as a distance, y, between an upper edge of the window glass and a corresponding top portion of the window frame; and (ii) adjusting (104) the voltage, V, applied to the motor in dependence on the window gap.

Step 104 includes four sub-steps that are described as follows: (a) when the window gap, y, is greater than a first value (e.g., 60 millimeters), V is set at a first voltage, $V_1$, as described by 106,108; (b) when y is less than the first value but greater than a second value (e.g., when 60 mm≧y>30 mm), V is set at a second voltage, $V_2$, that is monotonically adjusted as y is reduced, as described by 110,112; (c) when y is less than the second value but greater than a third value (e.g., when 30 mm≧y>4 mm), V is set at a third voltage, $V_3$, as described by 114,116; and (d) when y is less than the third value but greater than zero (e.g., when 4 mm≧y>0), V is set at a fourth voltage, $V_4$, as described by 118,120. When y reaches zero, the window is closed and V is set equal to zero.

Preferably, the relationship between motor voltage and window speed is direct. That is, an increase in the motor voltage effectuates an increase in the window speed, while a reduction in the motor voltage effectuates a decrease in the window speed.

In sub-step (a), $V_1$ is preferably equal to full voltage, as the window is in the first part of the closing cycle and is not yet approaching the pinch region. In the first part of the closing cycle, it is desired that the window move very quickly so as to minimize the total time that it takes to close the window.

In sub-step (b), $V_2$ is preferably a function, g(y), of the window gap, y, and is reduced as y is reduced from the first value (e.g., 60 mm) to the second value (e.g., 30 mm). The reduction in $V_2$ can be effected in either a continuous manner or in a substantially stepwise manner; the latter approach is illustrated in FIG. 3, where $V_2$ is reduced via multiple stepwise reductions as y is reduced from 60 mm to 30 mm.

In sub-step (c), $V_3$ is preferably set equal to minimum voltage because the window is then in the pinch region. The minimum voltage, $V_3$, is set at a predetermined level such that, if a physical obstruction is introduced between the window frame and the upper edge of the window glass when, e.g., 30 mm≧y>4 mm, the pinch force exerted on the obstruction by the window will be limited to less than about 100 newtons. In practice, the predetermined level for $V_3$ that ensures a pinch force of less than 100 newtons is dictated by the characteristics (e.g., torque, speed, and inertia) of the motor and the mass of the load (i.e., the window glass, etc.) driven by the motor.

In sub-step (d), $V_4$ is preferably equal to full voltage in order to ensure adequate closure (i.e., a good seal) between the window and the rubber molding on the top portion of the window frame.

Figure 4:
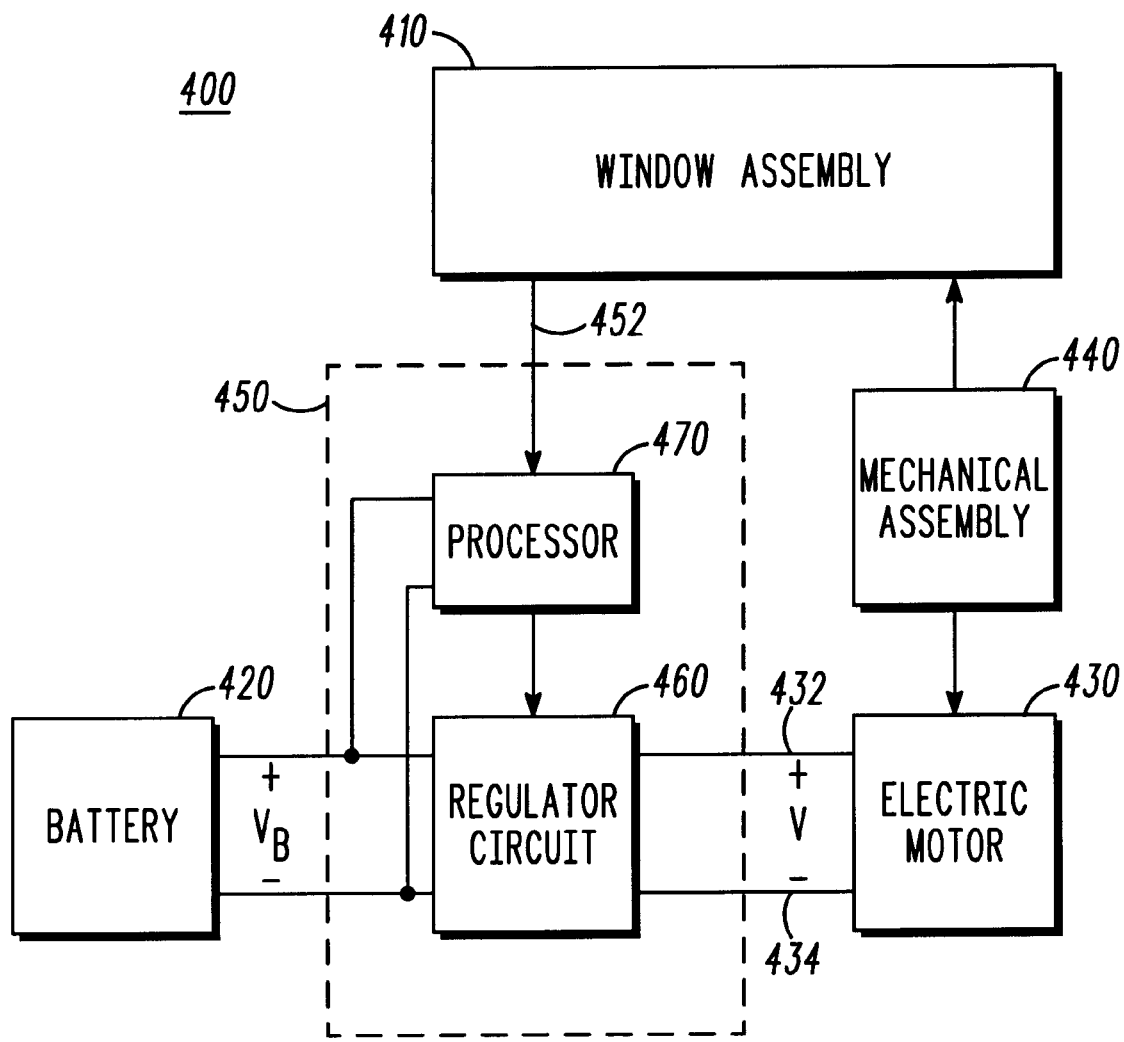
FIG. 4 is a block diagram description of a power-window system, in accordance with a preferred embodiment of the present invention.

Turning now to FIG. 4, a vehicle power-window system 400 comprises: a window assembly 410, a battery 420, an electric motor 430, a mechanical assembly 440, and a control circuit 450.

Window assembly 410 includes window glass, a window frame, and a sensor (not shown). The distance between an upper edge of the window glass and a corresponding top portion of the window frame defines a window gap. During operation, the sensor provides a signal that is indicative of the window gap. It is not necessary that the sensor provide a direct measurement of the window gap as previously defined herein; for example, the sensor may track the positions of one or more reference points on the window glass, which can then be readily translated into the value of the window gap simply by adding an appropriate numerical offset.

Battery 420 supplies a battery voltage, $V_B$, and serves as the source of energy for opening and closing the window. In a vehicle application, battery 420 is simply the existing 12 volt main battery installed in the vehicle.

Electric motor 430 has a rotatable shaft (not shown) and a pair of input terminals 432,434 for receiving a drive voltage, V. The speed of rotation of the shaft is understood to be a function of the drive voltage, V. Preferably, for a given mechanical load on the shaft, an increase in V effectuates an increase in the rotational speed of the shaft, and a decrease in V effectuates a decrease in the rotational speed of the shaft. Mechanical assembly 440 couples the shaft of electric motor 430 to the window glass of window assembly 410 such that rotation of the shaft in one direction lowers (i.e., opens) the window, and rotation of the shaft in the opposite direction raises (i.e., closed) the window.

Control circuit 450 is coupled between battery 420 and input terminals 432,434 of electric motor 430. Control circuit 450 has a control input 452 for receiving a signal from the sensor that is indicative of the window gap. During operation, control circuit 450 supplies drive voltage, V, to motor 430 in dependence on the window gap as follows: (a) when the window gap, y, is greater than a first value (e.g., when y>60 mm), V is set at a first voltage, $V_1$; (b) when y is less than the first value but greater than a second value (e.g., when 60 mm≧y>30 mm), V is set at a second voltage, $V_2$, that is monotonically adjusted as y is reduced; (c) when y is less than the second value but greater than a third value (e.g., when 30 mm≧y>4 mm), V is set at a third voltage, $V_3$; and (d) when y is less than the third value but greater than zero (e.g., when 4 mm≧y>0), V is set at a fourth voltage, $V_4$. When y reaches zero, the window is completely closed and V is set to zero.

$V_1$ is preferably equal to full voltage, as the window is then in the first part of the closing cycle and is not yet approaching the pinch region. In this first part of the closing cycle, it is desired that the window move very quickly so as to minimize the total time that it takes to close the window.

$V_2$ is preferably a function, g(y), of the window gap, y, and is reduced as y is reduced from the first value (e.g., 60 mm) to the second value (e.g., 30 mm). The reduction in $V_2$ can be effected in either a continuous manner or in a substantially stepwise manner; the latter approach is illustrated in FIG. 3, where $V_2$ is reduced via multiple stepwise reductions as y is reduced from 60 mm to 30 mm.

$V_3$ is preferably set at a minimum voltage because the window is then in the pinch region. The minimum speed, $V_3$, is set at a predetermined level such that, if a physical obstruction is introduced between the window frame and the upper edge of the window glass when, e.g., 30 mm≧y>4 mm, the pinch force exerted on the obstruction by the window will be limited to less than about one hundred newtons. In practice, the predetermined level for $V_3$ that ensures a pinch force of less than 100 newtons is dictated by the characteristics (e.g., torque, speed, and inertia) of the motor and the mass of the load (i.e., the window glass, etc.) driven by the motor.

$V_4$ is preferably equal to fall voltage in order to ensure adequate closure (i.e., a good seal) between the window and the rubber molding on the top portion of the window frame.

Referring again to FIG. 4, control circuit 450 preferably comprises a regulator circuit 460 and a processor 470. Regulator circuit 460 is coupled between battery 420 and input terminals 432,434 of electric motor 430. Regulator circuit 460 has a duty cycle, δ that is adjusted in response to the values of the window gap, y, and the battery voltage, $V_B$. The drive voltage, V, supplied to electric motor 430 is then a function of the battery voltage, $V_B$, and the duty cycle, δ. In practice, regulator circuit 460 may be implemented using any of a number of known topologies, such as a bridge-type switching regulator, well known to those skilled in the art.

Preferably, the drive voltage, V, supplied to electric motor 430 by control circuit 450 is substantially unaffected by at least some changes in the battery voltage, $V_B$. For example, an increase in $V_B$ (e.g., above its nominal value of 12 volts) is met by a decrease in the duty cycle, δ, of regulator circuit 460, such that the drive voltage, V, remains unchanged.

Processor 470 is coupled to regulator circuit 460, battery 420, and control input 452. Processor 470 implements a look-up table, such as that which is described in FIG. 5, that yields values for the duty cycle, δ, corresponding to predetermined combinations of values for the window gap, y, and the battery voltage, $V_B$. Use of a look-up table is preferred over other alternatives (e.g., such as computing the duty cycle on a real-time basis) because it is fast and capable of being implemented in a low cost manner (e.g., processor 470 may be realized using an inexpensive 8-bit processor).

Referring to FIG. 5, the look-up table serves two main functions. First, for a given battery voltage, it reduces the duty cycle (and, thus, the drive voltage supplied to the motor and the resulting speed at which the window closes) as the window gap is reduced from 60 mm to 30 mm. Second, for at least some changes in the battery voltage, it adjusts the duty cycle so as to minimize or prevent any change in the drive voltage supplied to the motor. For example, when y=30 mm and $V_B$=12 volts (i.e., nominal value), δ=95%. If $V_B$ suddenly increases (or, alternatively, if $V_B$ was higher than nominal to begin with) to, say, 14 volts, the look-up table calls for a reduced duty cycle of 84%. Because the duty cycle has been reduced from 95% to 84%, the drive voltage, V, supplied to the motor remains substantially unchanged in spite of the increase in $V_B$ from 12 volts to 14 volts.

It should be appreciated that the look-up table described in FIG. 5 gives values for the duty cycle that are suitable when regulator circuit 460 is implemented as a bridge-type (e.g., "h-bridge") switching regulator. The duty cycle values in the table of FIG. 5 correspond to the duty cycle of the switches in the switching regulator.

The disclosed method 100 and system 400 thus provide for closing of a power window in a safe and efficient manner.

Although the present invention has been described with reference to certain preferred embodiments, numerous modifications and variations can be made by those skilled in the art without departing from the novel spirit and scope of this invention.

What is claimed is:

1. A method for closing a motor-driven window, the window comprising window glass and a window frame, the method comprising the steps of:
   determining a window gap, wherein the window gap is defined as a distance between an upper edge of the window glass and a corresponding top portion of the window frame; and
   raising the window at a speed dependent upon the window gap, wherein the speed is set at:
      a first speed, while the window gap is greater than a first value;
      a second speed that is less than the first speed, while the window gap is less than the first value but greater than a second value;
      a third speed that is less than the first speed and the second speed, while the window gap is less than the second value but greater than the third value; and
      a fourth speed that is greater than the third speed, while the window gap is less than the third value but greater than zero.

2. The method of claim 1, wherein the second speed is reduced as the window gap is reduced from the first value to the second value.

3. The method of claim 1, wherein the second speed is reduced in a substantially stepwise manner as the window gap is reduced from the first value to the second value.

4. The method of claim 1, wherein the third speed is set at a predetermined level such that, in response to a physical obstruction introduced between the window frame and the upper edge of the window glass while the window gap is between the second value and the third value, the pinch force exerted on the obstruction by the window will be limited to less than about one hundred newtons.

5. The method of claim 1, wherein:
   the first value corresponds to a window gap of greater than about 60 millimeters;
   the second value corresponds to a window gap of less than about 60 millimeters and greater than about 30 millimeters;
   the third value corresponds to a window gap of less than about 30 millimeters and greater than about 4 millimeters; and
   the fourth value corresponds to a window gap of less than about 4 millimeters.

6. In a system wherein a window, comprising window glass and a window frame, is opened and closed via an electric motor and at a speed that is a function of a voltage applied to the electric motor, a method for closing the window, comprising the steps of:
   determining a window gap, wherein the window gap is defined as a distance between an upper edge of the window glass and a corresponding top portion of the window frame; and
   adjusting the voltage applied to the electric motor in dependence on the window gap, wherein:
      when the window gap is greater than a first value, the voltage is set at a first voltage;
      when the window gap is less than the first value but greater than a second value, the voltage is set at a second voltage that is monotonically adjusted as the window gap is reduced;
      when the window gap is less than the second value but greater than a third value, the voltage is set at third voltage; and
      when the window gap is less than the third value but greater than zero, the voltage is set at a fourth voltage.

7. The method of claim 6, wherein:
   an increase in the voltage applied to the electric motor effectuates an increase in the speed at which the window closes; and
   a reduction in the voltage applied to the electric motor effectuates a reduction on the speed at which the window closes.

8. The method of claim 7, wherein:
   the third voltage is substantially less than the first voltage; and as the window gap is reduced from the first value to the second value, the second voltage is reduced from an initial value approximately equal to the first voltage to a final value approximately equal to the third voltage.

9. The method of claim 8, wherein the second voltage is reduced via multiple stepwise reductions as the window gap is reduced from the first value to the second value.

10. The method of claim 6, wherein the third voltage is selected such that, in response to introduction of a physical obstruction between the window frame and the upper edge of the window glass while the window gap is between the second value and the third value, the pinch force exerted on the obstruction by the window will be limited to less than about one hundred newtons.

11. The method of claim 6, wherein:
the first value is about 60 millimeters;
the second value is about 30 millimeters; and
the third value is about 4 millimeters.

12. A vehicle power-window system, comprising:
a window assembly comprising: window glass, a window frame, and a sensor, wherein the distance between an upper edge of the window glass and a corresponding top portion of the window frame defines a window gap, and the sensor is operable to provide a signal indicative of the window gap;
a battery operable to supply a battery voltage;
an electric motor having a rotatable shaft and a pair of input terminals adapted to receive a drive voltage, wherein the speed of rotation of the shaft is a function of the drive voltage;
a mechanical assembly coupling the shaft of the electric motor to the window, and operable to open and close the window in response to rotation of the shaft; and
a control circuit coupled between the battery and the input terminals of the electric motor, wherein the control circuit has a control input for receiving the signal from the sensor that is indicative of the window gap, and is operable to supply drive voltage to the electric motor in dependence on the window gap, wherein:
when the window gap is greater than a first value, the drive voltage is set at a first voltage;
when the window gap is less than the first value but greater than a second value, the drive voltage is set at a second voltage that is monotonically adjusted as the window gap is reduced;
when the window gap is less than the second value but greater than a third value, the drive voltage is set at third voltage; and
when the window gap is less than the third value but greater than zero, the drive voltage is set at a fourth voltage.

13. The system of claim 12, wherein:
the third voltage is substantially less than the first voltage; and
as the window gap is reduced from the first value to the second value, the second voltage is reduced via multiple stepwise reductions from an initial value that is approximately equal to the first voltage to a final value that is approximately equal to the third voltage.

14. The method of claim 12, wherein the third voltage is selected such that, in response to introduction of a physical obstruction between the window frame and the upper edge of the window glass while the window gap is between the second value and the third value, the pinch force applied to the obstruction by the window will be limited to less than about one hundred newtons.

15. The method of claim 12, wherein:
the first value is about 60 millimeters;
the second value is about 30 millimeters; and
the third value is about 4 millimeters.

16. The system of claim 12, wherein the drive voltage supplied to the electric motor by the control circuit is substantially unaffected by at least some changes in the battery voltage.

17. The system of claim 12, wherein the control circuit comprises a regulator circuit coupled between the battery and the input terminals of the electric motor, the regulator circuit having a duty cycle that is adjusted in response to the values of the window gap and the battery voltage.

18. The system of claim 17, wherein the drive voltage supplied to the electric motor is a function of the battery voltage and the duty cycle of the regulator circuit.

19. The system of claim 17, wherein the control circuit further comprises a processor that is coupled to the regulator circuit, the battery, and the control input, wherein the processor implements a look-up table that yields values for the duty cycle corresponding to predetermined combinations of values for the window gap and the battery voltage.

20. The system of claim 19, wherein, in response to an increase in the battery voltage above its nominal value, the processor reduces the duty cycle of the regulator circuit such that the drive voltage supplied to the electric motor remains substantially unaffected by the increase in the battery voltage.

* * * * *